(12) United States Patent
Hansen et al.

(10) Patent No.: US 7,796,696 B2
(45) Date of Patent: Sep. 14, 2010

(54) ASYMMETRICAL MULTIPLE STREAM WIRELESS COMMUNICATION USING STBC

(75) Inventors: Christopher James Hansen, Sunnyvale, CA (US); Joonsuk Kim, San Jose, CA (US); Rajendra T. Moorti, Mountain View, CA (US); Nambirajan Seshadri, Irvine, CA (US); Jason Alexander Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 843 days.

(21) Appl. No.: 11/057,842

(22) Filed: Feb. 15, 2005

(65) Prior Publication Data

US 2005/0185730 A1 Aug. 25, 2005

Related U.S. Application Data

(60) Provisional application No. 60/545,854, filed on Feb. 19, 2004, provisional application No. 60/556,264, filed on Mar. 25, 2004, provisional application No. 60/575,920, filed on Jun. 1, 2004, provisional application No. 60/581,876, filed on Jun. 22, 2004, provisional application No. 60/637,855, filed on Dec. 22, 2004.

(51) Int. Cl.
*H04K 1/10* (2006.01)
*H04L 27/28* (2006.01)

(52) U.S. Cl. .................................................... 375/260

(58) Field of Classification Search ......... 375/259–260, 375/267, 295, 299, 316, 347
See application file for complete search history.

(56) References Cited

U.S. PATENT DOCUMENTS 6,351,499 B1 * 2/2002 Paulraj et al. ............... 375/267
6,771,705 B2 * 8/2004 Kenney et al. .............. 375/267

(Continued)

FOREIGN PATENT DOCUMENTS

EP   1 073 294 A1   1/2001

OTHER PUBLICATIONS

Peretz, Matthew, "802.11, Bluetooth Will Co-Exist: Study," pp. 1-2, published by www.80211planet.com, Oct. 30, 2001, see http://www.80211-planet.com/news/print/0,,1481_913471,00.html.

(Continued)

*Primary Examiner*—Jean B Corrielus
(74) *Attorney, Agent, or Firm*—McAndrews, Held & Malloy, Ltd.

(57) ABSTRACT

A method of communicating data to M receiving antennas from N transmitting antennas, where M and N are integers and unequal, has the steps of sending a message to determine a number of transmit paths to be used, awaiting an acknowledgement message comprising a number of receiver paths, setting the number of transmit paths based on at least the acknowledgement message, producing data streams from outbound data based on the number of transmit paths, applying the data streams to a space/time encoder to produce encoded signals and transmitting the encoded signals from at least a portion of N transmitting antennas.

21 Claims, 10 Drawing Sheets

U.S. PATENT DOCUMENTS

| | | | | |
|---|---|---|---|---|
| 6,922,445 | B1* | 7/2005 | Sampath et al. | 375/267 |
| 7,092,737 | B2* | 8/2006 | Horng et al. | 455/562.1 |
| 7,301,893 | B2* | 11/2007 | Onggosanusi et al. | 370/210 |
| 7,356,093 | B2* | 4/2008 | Liu et al. | 375/308 |
| 2002/0105961 | A1* | 8/2002 | Hottinen et al. | 370/442 |
| 2003/0003863 | A1* | 1/2003 | Thielecke et al. | 455/39 |
| 2004/0014431 | A1* | 1/2004 | Lo | 455/73 |
| 2004/0042560 | A1* | 3/2004 | Ferreol et al. | 375/308 |
| 2004/0116077 | A1* | 6/2004 | Lee et al. | 455/101 |
| 2004/0258174 | A1* | 12/2004 | Shao et al. | 375/267 |
| 2005/0111376 | A1* | 5/2005 | Raghothaman et al. | 370/252 |
| 2005/0135497 | A1* | 6/2005 | Kim et al. | 375/267 |
| 2005/0220211 | A1* | 10/2005 | Shim et al. | 375/267 |
| 2005/0265225 | A1* | 12/2005 | Mahadevappa et al. | 370/210 |
| 2006/0093060 | A1* | 5/2006 | Jung et al. | 375/267 |

OTHER PUBLICATIONS

"Bluetooth and 802.11: A Tale of Two Technologies," pp. 1-2, published by www.10meters.com, 2001, see http://www.10meters.com/blue_802.html.

Shaw, Keith, "Bluetooth and Wi-Fi: Friends or foes?" pp. 1-2, published by NetworkWorldFusion, Jun. 18, 2001, see http://www.nwfusion.com/cgi-bin/mailto/x.cgi.

Conover, Joel, "Anatomy of IEEE 802.11b Wireless," pp. 1-3, published by www.networkcomputing.com, Aug. 7, 2000, see http://www.networkcomputing.com/shared/printArticle.jhtml?.../1115ws2full.html&pub=nw.

Brewin, Bob, "Report: IBM, Intel, cell companies eye national Wi-Fi net," pp. 1-2, published by www.computerworld.com, Jul. 16, 2002, see http://www.computerworld.com/mobiletopics/mobile/story/0,10801,72752,00.html.

Brewin, Bob, "Vendors field new Wireless LAN Security Products," pp. 1-3, published by www.computerworld.com, Jul. 22, 2002, see http://www.computerworld.com/mobiletopics/mobile/technology/story/0,10801,72912,00.html.

Brewin, Bob, "Microsoft Plans Foray Into Home WLAN Device Market," pp. 1-3, published by www.computerworld.com, Jul. 22, 2002, see http://www.computerworld.com/networkingtopics/networking/lanwan/story/0,10801,72890.html.

"Simple 802.11b Wireless Ethernet Network with an Access Point," pp. 1-2, published by Home Network Diagrams, 2001, see http://www.homenethelp.com/web/diagram/access-point.asp.

Tyson, Jeff, "How Wireless Networking Works," pp. 1-6, published by Howstuffworks, Inc., 2002, see http://www.howstuffworks.com/wireless-network.htm/printable.html.

"Bridging a Wireless 802.11b Network with a Wired Ethernet Network," pp. 1-2, published by Home Network Diagrams, 2001, see http://www.homenethelp.com/web/diagram/wireless-bridged.asp.

"Wireless Access Point (802.11b) of the Router Variety," pp. 1-2, published by Home Network Diagrams, 2001, see http://www.homenethelp.com/web/diagram/share-wireless-ap.asp.

"Brief Tutorial on IEEE 802.11 Wireless LANs," intersil™, Feb. 1999.

"Wireless Data Blaster," Scientific American.com, David G. Leeper, May 4, 2002.

"Increasing Data Rate Over Wireless Channels," Ayman F. Naguilo, et al., IEEE Signal Processing Magazine, May 2000.

"Efficient Adaptive Receivers for Joint Equalization and Interference Cancellation in Multiuser Space-Time-Block-Coded Systems," Waleed M. Younis, et al., IEEE Transactions of Signal Processing, vol. 51, No. 11, Nov. 2003.

"PAWNs: Satisfying the Need for Ubiquitous Secure Connectivity and Location Services," Paramvir Bahl, et al., IEEE Wireless Communications, Feb. 2002.

"WLAN-GPRS Integration for Next-Generation Mobile Data Networks," Apostolis K. Salkintzis, et al., IEEE Wireless Communications, Oct. 2002.

Jackson, Donny, "Ultrawideband May Thwart 802.11, Bluetooth Efforts," pp. 1-2, published by Telephony, Feb. 11, 2002, see http://currenti.../magazinearticle.asp?magazinearticleid=140454&magazineid=7&mode=prin.

* cited by examiner

| Rate Category | # of Transmit Antennas | # of Receive Antennas | STBC code rate |
|---|---|---|---|
| HIGH/MED | 2 | 2, 3, 4 | no STBC |
| LOW | 2 | 2, 3, 4 | rate = 1 |
| HIGH/MED | 3 | 2, 3 | no STBC |
| HIGH/MED | 3 | 2 | rate = 1 |
| LOW | 3 | 2, 3, 4 | rate = 1 |
| HIGH/MED | 4 | 4 | no STBC |
| HIGH/MED | 4 | 3 | rate = 3 |
| HIGH/MED | 4 | 2 | rate = 2 |
| LOW | 4 | 2, 3, 4 | rate = 2 |

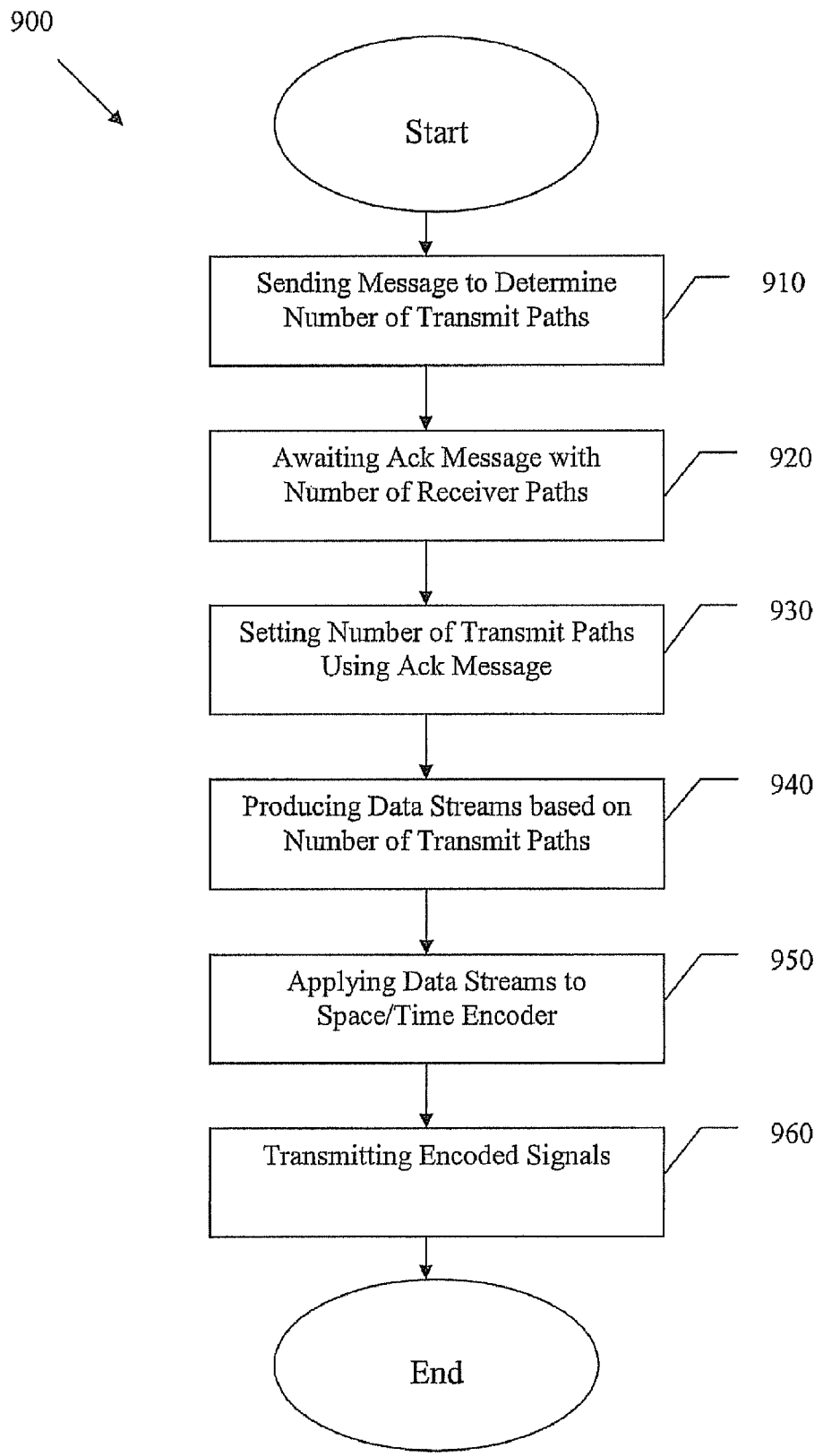

ASYMMETRICAL MULTIPLE STREAM WIRELESS COMMUNICATION USING STBC

REFERENCE TO RELATED APPLICATIONS

This application claims priority of U.S. Provisional Patent Application Ser. Nos. 60/545,854, filed Feb. 19, 2004; 60/556,264, filed Mar. 25, 2004; 60/575,920, filed Jun. 1, 2004; 60/581,876, filed Jun. 22, 2004 and 60/637,855, filed Dec. 22, 2004. The subject matter of these earlier filed applications are hereby incorporated by reference.

BACKGROUND OF THE INVENTION

1. Technical Field of the Invention

This invention relates generally to wireless communication systems and more particularly to a transmitter transmitting at high data rates with such wireless communication systems. Additionally, the present invention allows the detection and reception of multiple data streams for higher data rates.

2. Description of Related Art

Communication systems support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, BLUETOOTH™, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

For each wireless communication device to participate in wireless communications, it may include a built-in radio transceiver (i.e., receiver and transmitter) or may be coupled to an associated radio transceiver (e.g., a station for in-home and/or in-building wireless communication networks, RF modem, etc.). The transmitter may include a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

The transmitter may include a data modulation stage, one or more intermediate frequency stages, and a power amplifier. The data modulation stage can convert raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

The transmitter includes at least one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SOSI) communication, even if the receiver includes multiple antennas that are used as diversity antennas (i.e., selecting one of them to receive the incoming RF signals). For SISO wireless communications, a transceiver includes one transmitter and one receiver.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

Further, asymmetric MIMO is any M transmit antenna, N receive antenna communication system in which M does not equal N. The case of M less than N does not need to be considered by the IEEE 802.11n standard, in that the communication system is "overdetermined." However, the practical case of M greater than N does need to be considered for MIMO systems. This case may happen when an access point (AP) with many antennas attempts to send frames to devices with only two (e.g. an old laptop PC). This case may also be relevant to certain broadcast/multicast greenfield frame transmissions, e.g. beacons. Therefore, a need exists for a WLAN transmitter and receiver system that is capable of high data throughput and supports asymmetrical MIMO transmissions.

BRIEF SUMMARY OF THE INVENTION

According to one embodiment of the present invention, method of communicating data to M receiving antennas from N transmitting antennas, where M and N are integers and unequal, having the steps of sending a message to determine a number of transmit paths to be used (FIG. 9, 910), awaiting an acknowledgement message comprising a number of receiver paths (FIG. 9, 920), setting the number of transmit paths based on at least the acknowledgement message (FIG. 9, 930), producing data streams from outbound data based on the number of transmit paths (FIG. 9, 940), applying the data streams to a space/time encoder to produce encoded signals (FIG. 9, 950) and transmitting the encoded signals from at least a portion of N transmitting antennas (FIG. 9, 960).

Additionally, the method may be performed with the number of transmit paths being less than the portion of the N transmitting antennas. Also, the encoding of the data streams may be through space-time block coding or through a turbocoding scheme. Also, the step of sending a message may include sending a message that is compatible with legacy systems employing a single antenna. Also, the legacy systems may be systems communicating according to IEEE 802.11 wireless standards.

According to another embodiment, a transceiver for communicating data from N transmitting antennas to M receiving antennas, where M and N are integers and are unequal, includes sending means for sending a message to determine a number of transmit paths to be used, awaiting means for awaiting an acknowledgement message comprising a number of receiver paths, setting means for setting the number of transmit paths based on at least the acknowledgement message, producing means for producing data streams from outbound data based on the number of transmit paths, applying means for applying the data streams to a space/time encoder to produce encoded signals and transmitting means for transmitting the encoded signals from at least a portion of N transmitting antennas.

According to another embodiment, a transceiver for communicating data from N transmitting antennas to M receiving antennas, where M and N are integers that are unequal, includes a demultiplexer, configured to set a number of transmit paths and to produce data streams from outbound data, a space/time encoder, configured to produce encoded signals from the data streams and N transmit antennas. At least one of the N transmit antennas is configured to send a message to determine a number of transmit paths to be used and to receive an acknowledgement message comprising a number of receiver paths. Also, the demultiplexer is configured to set the number of transmit paths based on at least the acknowledgement message and the encoded signals are transmitted from at least a portion of N transmitting antennas.

BRIEF DESCRIPTION OF THE DRAWINGS

For the present invention to be easily understood and readily practiced, the present invention will now be described, for purposes of illustration and not limitation, in conjunction with the following figures:

FIG. 9 is a flow diagram for a method of communicating data to M receiving antennas from N transmitting antennas, where M and N are integers and unequal, in accordance with one embodiment of the present invention.

DETAILED DESCRIPTION OF THE PREFERRED EMBODIMENTS

Figure 1:
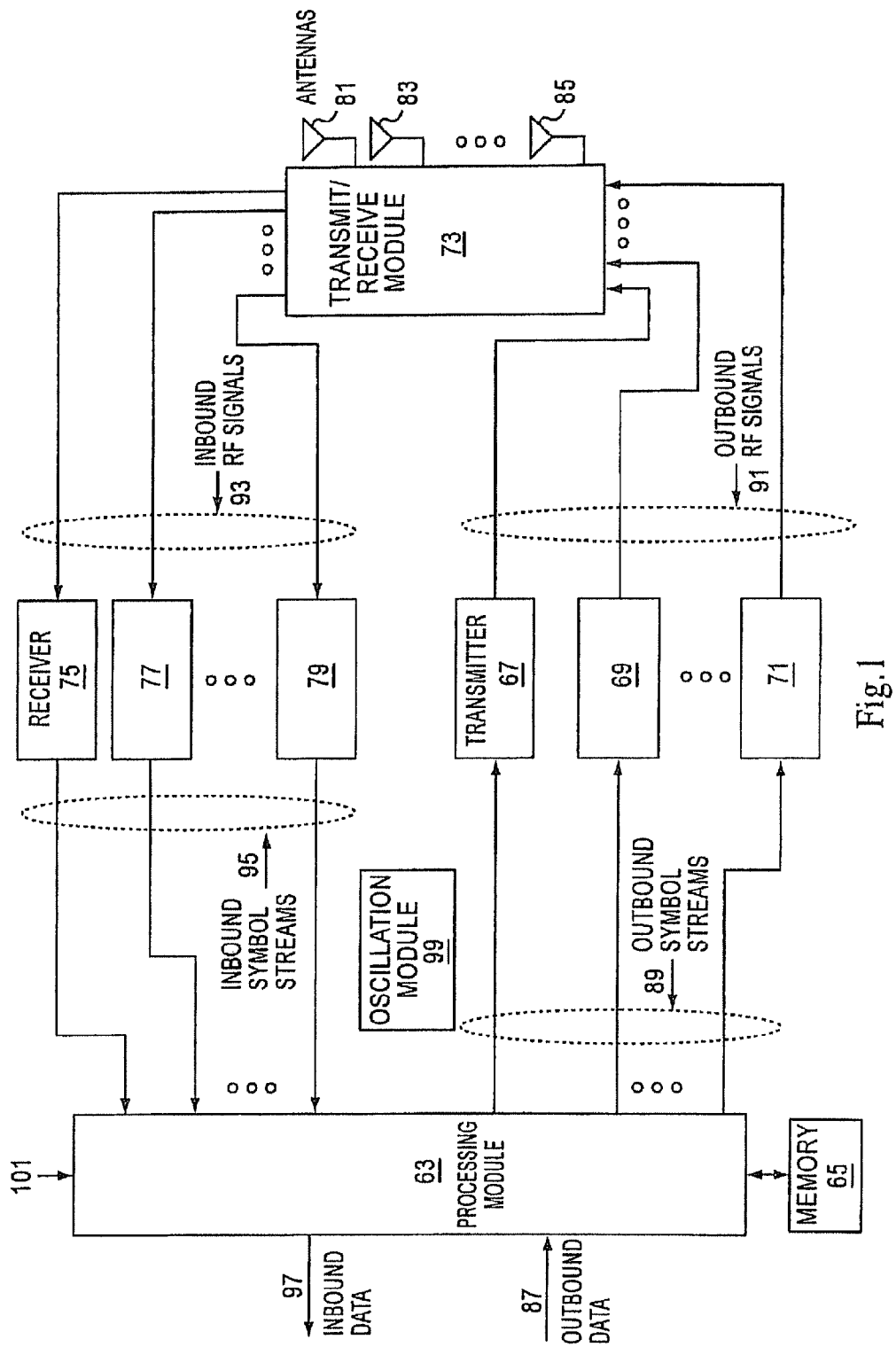
FIG. 1 is a schematic block diagram of a wireless communication device in accordance with one embodiment of the present invention.

FIG. 1 is a schematic block diagram illustrating a wireless communication device, according to an example of the invention. The device includes a baseband processing module 63, memory 65, a plurality of radio frequency (RF) transmitters 67, 69, 71, a transmit/receive (T/R) module 73, a plurality of antennas 81, 83, 85, a plurality of RF receivers 75, 77, 79, and a local oscillation module 99. The baseband processing module 63, in combination with operational instructions stored in memory 65, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and/or digital baseband to IF conversion. The baseband processing module 63 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 63 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the baseband processing module 63 receives the outbound data 87 and, based on a mode selection signal 101, produces one or more outbound symbol streams 89. The mode selection signal 101 will indicate a particular mode as are indicated in mode selection tables. For example, the mode selection signal 101 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. A code rate is supplied as well as number of coded bits per subcarrier (NBPSC), coded bits per OFDM symbol (NCBPS), data bits per OFDM symbol (NDBPS), error vector magnitude in decibels (EVM), sensitivity which indicates the maximum receive power required to obtain a target packet error rate (e.g., 10% for IEEE 802.11a), adjacent channel rejection (ACR), and an alternate adjacent channel rejection (AACR).

The mode selection signal may also indicate a particular channelization for the corresponding mode. The mode select signal may further indicate a power spectral density mask value. The mode select signal may alternatively indicate a rate that has a 5 GHz frequency band, 20 MHz channel bandwidth and a maximum bit rate of 54 megabits-per-second. As a further alternative, the mode select signal 101 may indicate a 2.4 GHz frequency band, 20 MHz channels and a maximum bit rate of 192 megabits-per-second. A number of antennas may be utilized to achieve the higher bandwidths. In this instance, the mode select would further indicate the number of antennas to be utilized. Another mode option may be utilized where the frequency band is 2.4 GHz, the channel bandwidth is 20 MHz and the maximum bit rate is 192 megabits-per-second. Various bit rates ranging from 12 megabits-per-second to 216 megabits-per-second utilizing 2-4 antennas and a spatial time encoding rate may be employed. The mode select signal 101 may further indicate a particular operating mode, which corresponds to a 5 GHz frequency band having 40 MHz frequency band having 40 MHz channels and a maximum bit rate of 486 megabits-per-second. The bit rate may range, in this example, from 13.5 megabits-per-second to 486 megabits-per-second utilizing 1-4 antennas and a corresponding spatial time code rate.

The baseband processing module 63, based on the mode selection signal 101 produces the one or more outbound symbol streams 89 from the output data 88. For example, if the mode selection signal 101 indicates that a single transmit antenna is being utilized for the particular mode that has been selected, the baseband processing module 63 will produce a single outbound symbol stream 89 (e.g., FIG. 9, 930, 940). Alternatively, if the mode select signal indicates 2, 3 or 4 antennas, the baseband processing module 63 will produce 2, 3 or 4 outbound symbol streams 89 corresponding to the number of antennas from the output data 88 (e.g., FIG. 9, 930, 940).

Depending on the number of outbound streams 89 produced by the baseband module 63, a corresponding number of the RF transmitters 67, 69, 71 can be enabled to convert the outbound symbol streams 89 into outbound RF signals 91. The implementation of the RF transmitters 67, 69, 71 will be further described with reference to FIG. 2. The transmit/receive module 73 receives the outbound RF signals 91 and provides each outbound RF signal to a corresponding antenna 81, 83, 85.

When the radio 60 is in the receive mode, the transmit/receive module 73 receives one or more inbound RF signals via the antennas 81, 83, 85. The T/R module 73 provides the inbound RF signals 93 to one or more RF receivers 75, 77, 79. The RF receiver 75, 77, 79, which will be described in greater detail with reference to FIG. 4, converts the inbound RF signals 93 into a corresponding number of inbound symbol streams 96. The number of inbound symbol streams 95 will correspond to the particular mode in which the data was received. The baseband processing module 63 receives the inbound symbol streams 89 and converts them into inbound data 97.

As one of average skill in the art will appreciate, the wireless communication device of FIG. 1 may be implemented using one or more integrated circuits. For example, the device may be implemented on one integrated circuit, the baseband processing module 63 and memory 65 may be implemented on a second integrated circuit, and the remaining components, less the antennas 81, 83, 85, may be implemented on a third integrated circuit. As an alternate example, the device may be implemented on a single integrated circuit.

Figure 2A:
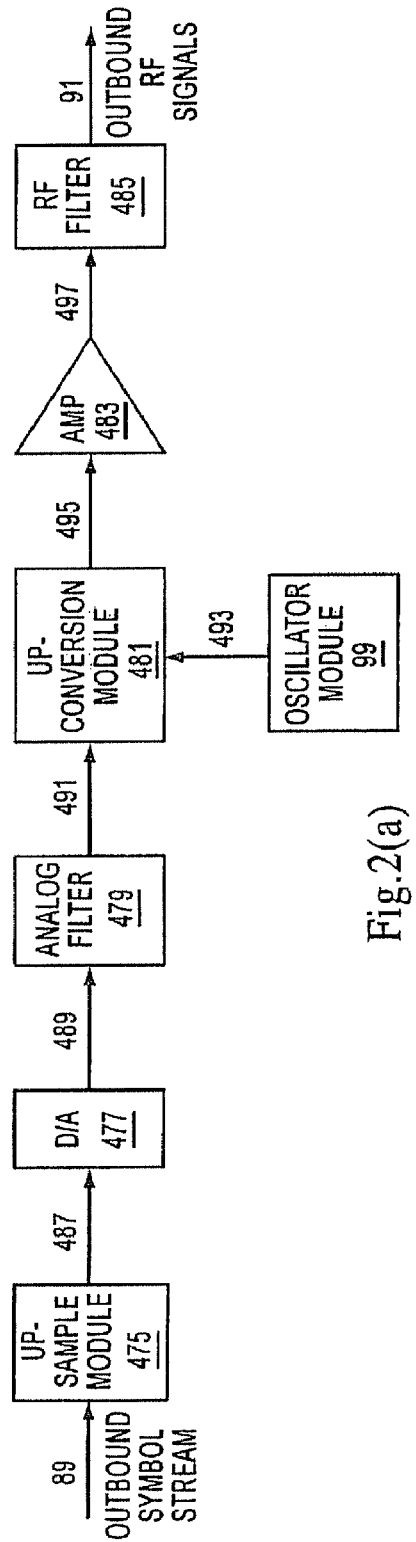
FIG. 2 illustrates schematic block diagrams of a transmitter and receiver, with FIG. 2(*a*) providing a schematic block diagram of an RF transmitter and with FIG. 2(*b*) providing a schematic block diagram of an RF receiver, in accordance with embodiments of the present invention.
Figure 2B:
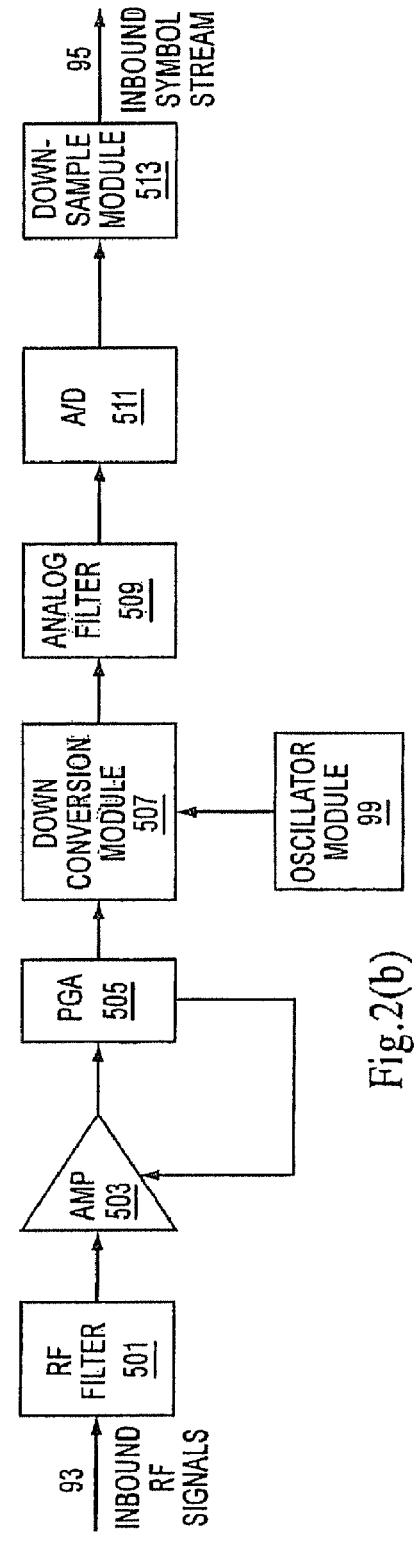

FIG. 2(*a*) is a schematic block diagram of an embodiment of an RF transmitter 67, 69, 71. The RF transmitter may include a digital filter and up-sampling module 475, a digital-to-analog conversion module 477, an analog filter 479, and up-conversion module 81, a power amplifier 483 and a RF filter 485. The digital filter and up-sampling module 475 receives one of the outbound symbol streams 89 and digitally filters it and then up-samples the rate of the symbol streams to a desired rate to produce the filtered symbol streams 487. The digital-to-analog conversion module 477 converts the filtered symbols 487 into analog signals 489. The analog signals may include an in-phase component and a quadrature component.

The analog filter 479 filters the analog signals 489 to produce filtered analog signals 491. The up-conversion module 481, which may include a pair of mixers and a filter, mixes the filtered analog signals 491 with a local oscillation 493, which is produced by local oscillation module 99, to produce high frequency signals 495. The frequency of the high frequency signals 495 corresponds to the frequency of the RF signals 492.

The power amplifier 483 amplifies the high frequency signals 495 to produce amplified high frequency signals 497. The RF filter 485, which may be a high frequency band-pass filter, filters the amplified high frequency signals 497 to produce the desired output RF signals 91.

As one of average skill in the art will appreciate, each of the radio frequency transmitters 67, 69, 71 will include a similar architecture as illustrated in FIG. 2(*a*) and further include a shut-down mechanism such that when the particular radio frequency transmitter is not required, it is disabled in such a manner that it does not produce interfering signals and/or noise.

FIG. 2(*b*) is a schematic block diagram of each of the RF receivers 75, 77, 79. In this embodiment, each of the RF receivers may include an RF filter 501, a low noise amplifier (LNA) 503, a programmable gain amplifier (PGA) 505, a down-conversion module 507, an analog filter 509, an analog-to-digital conversion module 511 and a digital filter and down-sampling module 513. The RF filter 501, which may be a high frequency band-pass filter, receives the inbound RF signals 93 and filters them to produce filtered inbound RF signals. The low noise amplifier 503 amplifies the filtered inbound RF signals 93 based on a gain setting and provides the amplified signals to the programmable gain amplifier 505. The programmable gain amplifier further amplifies the inbound RF signals 93 before providing them to the down-conversion module 507.

The down-conversion module 507 includes a pair of mixers, a summation module, and a filter to mix the inbound RF signals with a local oscillation (LO) that is provided by the local oscillation module to produce analog baseband signals. The analog filter 509 filters the analog baseband signals and provides them to the analog-to-digital conversion module 511 which converts them into a digital signal. The digital filter and down-sampling module 513 filters the digital signals and then adjusts the sampling rate to produce the inbound symbol stream 95.

Figure 3A:
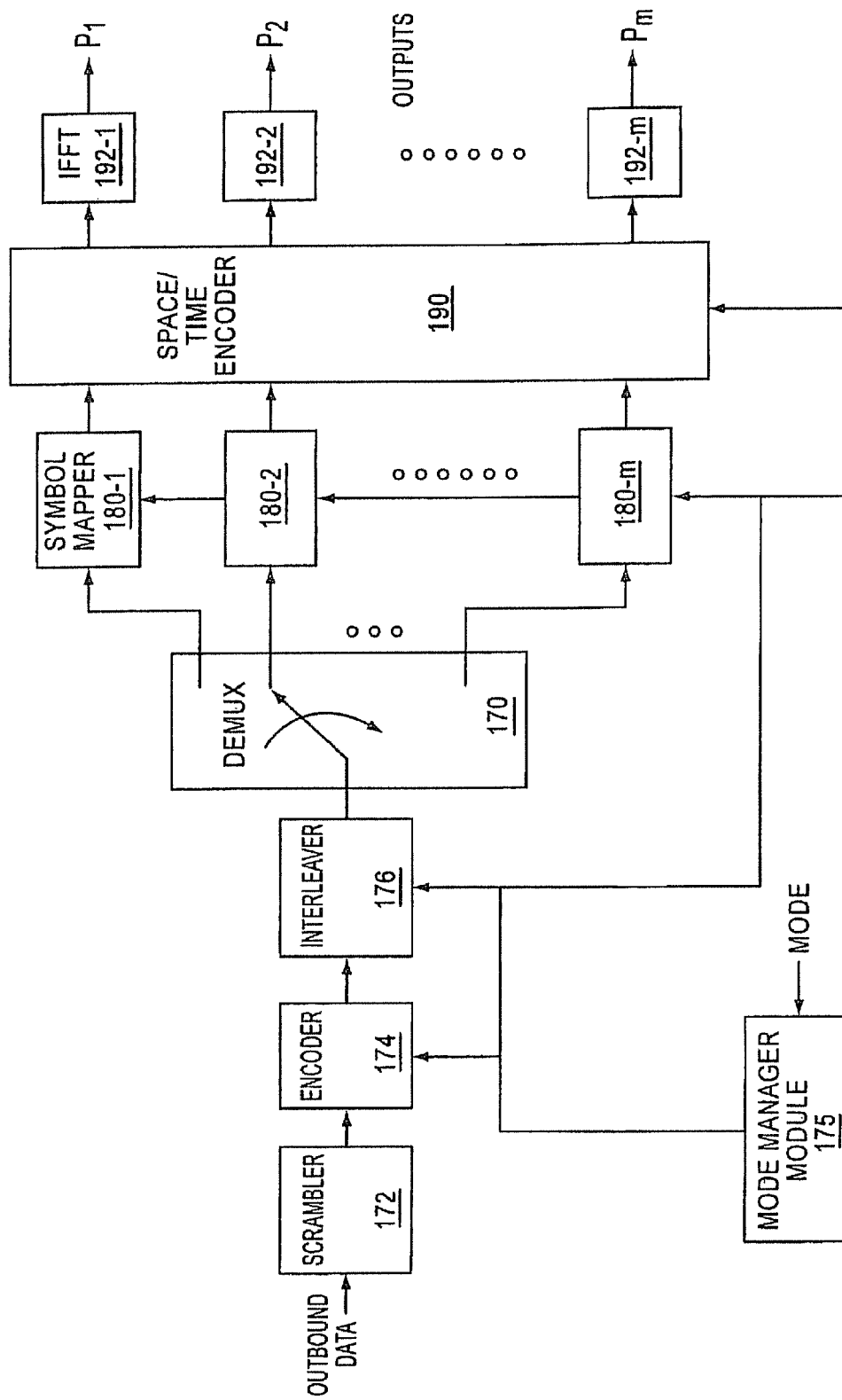
FIGS. 3(*a*) and 3(*b*) are a schematic block diagram of a transmitter in accordance one embodiment of with the present invention.

FIGS. 3(*a*) and 3(*b*) illustrate a schematic block diagram of a multiple transmitter in accordance with the present invention. In FIG. 3(*a*), the baseband processing is shown to include a scrambler 172, channel encoder 174, interleaver 176, demultiplexer 170, a plurality of symbol mappers 180-1 through 180-m, a space/time encoder 190 and a plurality of inverse fast Fourier transform (IFFT)/cyclic prefix addition modules 192-1 through 192-m. The baseband portion of the transmitter may further include a mode manager module 175 that receives the mode selection signal and produces settings for the radio transmitter portion and produces the rate selection for the baseband portion.

In operations, the scrambler 172 adds (in GF2) a pseudo random sequence to the outbound data bits 88 to make the data appear random. A pseudo random sequence may be generated from a feedback shift register with the generator polynomial, for example, of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with standards such as IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔rds and ¾ according to the specified rate tables. For backward compatibility with IEEE 802.11(b) and the CCK modes of IEEE 802.11(g), the channel encoder has the form of a CCK code as defined in IEEE 802.11(b). For higher data rates, the channel encoder may use the same convolution encoding as described above or it may use a more powerful code, including a convolutional code with more states, a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes, the interleaver will interleave data over multiple transmit streams. The demultiplexer 170 converts the serial interleave stream from interleaver 176 into M-parallel streams for transmission.

Each symbol mapper 180-m through 180-m receives a corresponding one of the M-parallel paths of data from the demultiplexer. Each symbol mapper locks maps bit streams to quadrature amplitude modulated QAM symbols (e.g., BPSK, QPSK, 16 QAM, 64 QAM, 256 QAM, et cetera) according to the rate tables. For IEEE 802.11(a) backward compatibility, double gray coding may be used.

The map symbols produced by each of the symbol mappers 180 are provided to the space/time encoder 190 (e.g., FIG. 9, 950). Thereafter, output symbols are provided to the IFFT/cyclic prefix addition modules 192-1 through 192-m, which performs frequency domain to time domain conversions and adds a prefix, which allows removal of inter-symbol interference at the receiver. In general, a 64-point IFFT will be used for 20 MHz channels and 128-point IFFT will be used for 40 MHz channels.

In one embodiment, the number of M-input paths will equal the number of P-output paths. In another embodiment, the number of output paths P will equal M+1 paths. For each of the paths, the space/time encoder multiples the input symbols with an encoding matrix that has the form of:

$$\begin{bmatrix} C_1 & C_2 & C_3 & C_4 & \cdots & C_{2M} \\ -C_2^* & C_1^* & -C_4^* & C_3^* & \cdots & C_{2M-1}^* \end{bmatrix}$$

Note that the columns of the encoding matrix correspond to the number of output paths and the rows correspond to the output symbols.

Figure 3B:
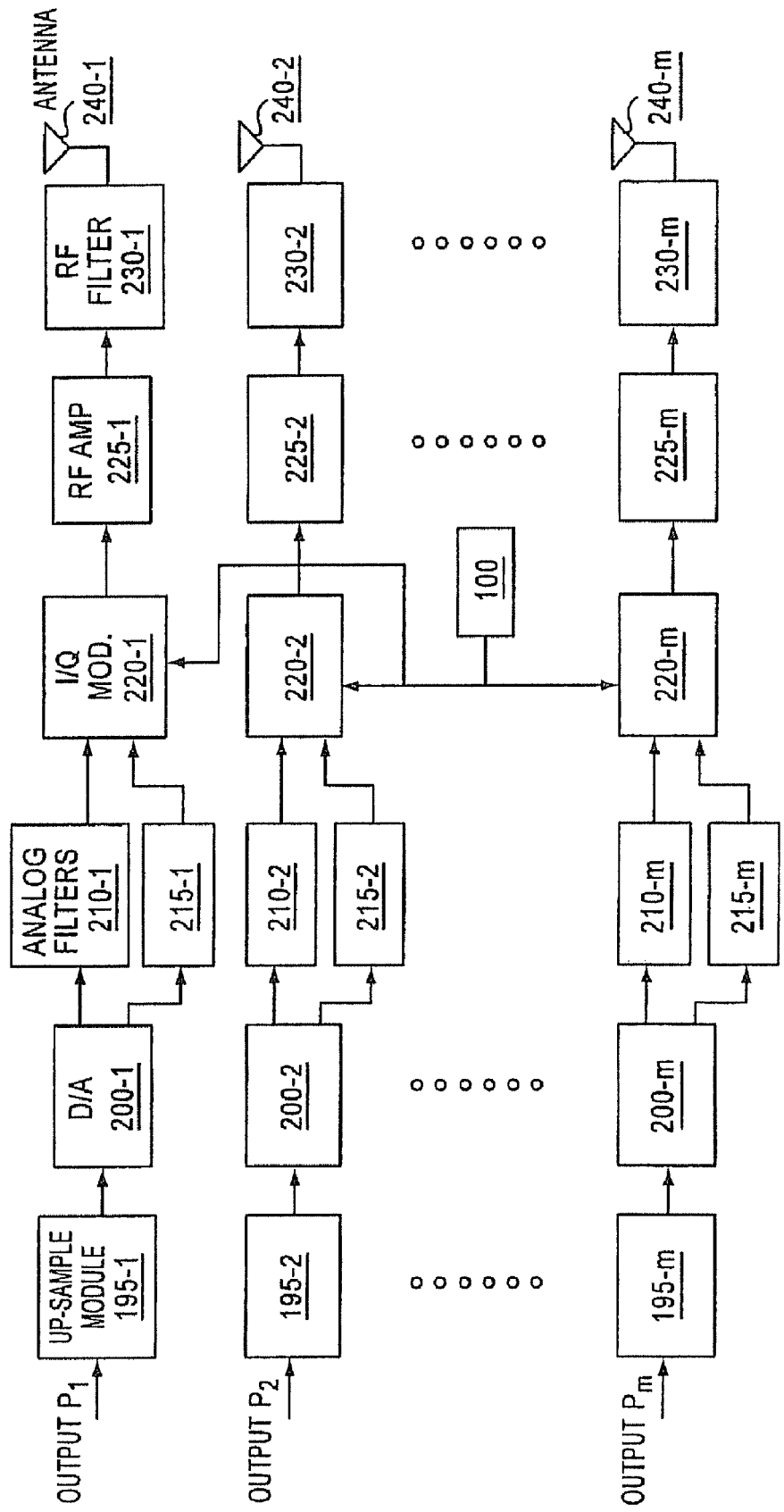

FIG. 3(b) illustrates the radio portion of the transmitter that includes a plurality of digital filter/up-sampling modules 195-1 through 195-m, digital-to-analog conversion modules 200-1 through 200-m, analog filters 210-1 through 210-m and 215-1 through 215-m, I/Q modulators 220-1 through 220-m, RF amplifiers 225-1 through 225-m, RF filters 230-1 through 230-m and antennas 240-1 through 240-m. The P-outputs from the other stage are received by respective digital filtering/up-sampling modules 195-1 through 195-m.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 195-1 through 195-m filter the corresponding symbols and adjust the sampling rates to correspond with the desired sampling rates of the digital-to-analog conversion modules 200. The digital-to-analog conversion modules 200 convert the digital filtered and up-sampled signals into corresponding in-phase and quadrature analog signals. The analog filters 210 and 215 filter the corresponding in-phase and/or quadrature components of the analog signals, and provide the filtered signals to the corresponding I/Q modulators 220. The I/Q modulators 220 based on a local oscillation, which is produced by a local oscillator 100, up-converts the I/Q signals into radio frequency signals. The RF amplifiers 225 amplify the RF signals which are then subsequently filtered via RF filters 230 before being transmitted via antennas 240 (e.g., FIG. 9, 960).

Figure 4A:
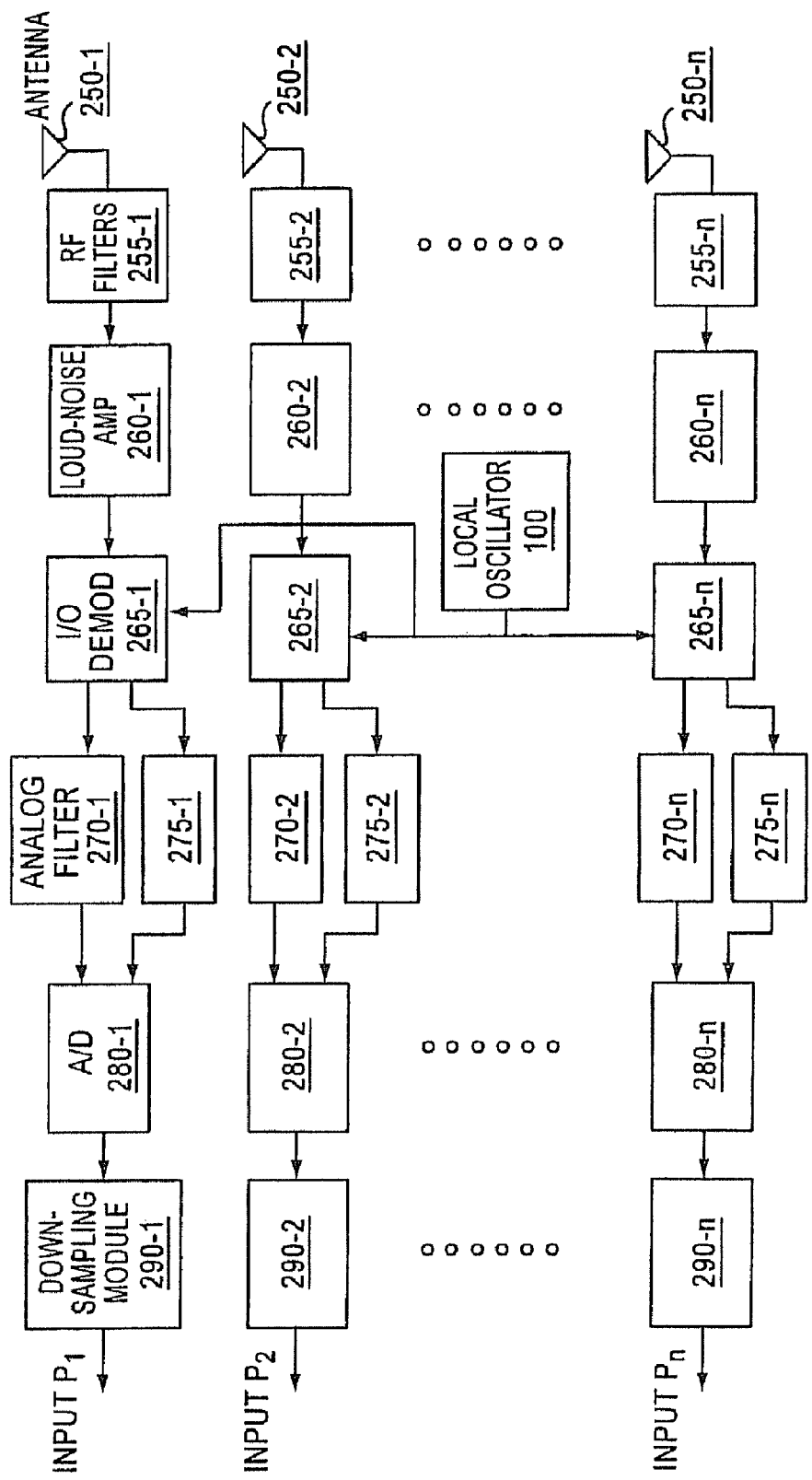
FIGS. 4(*a*) and 4(*b*) are a schematic block diagram of a receiver in accordance with one embodiment of the present invention.
Figure 4B:
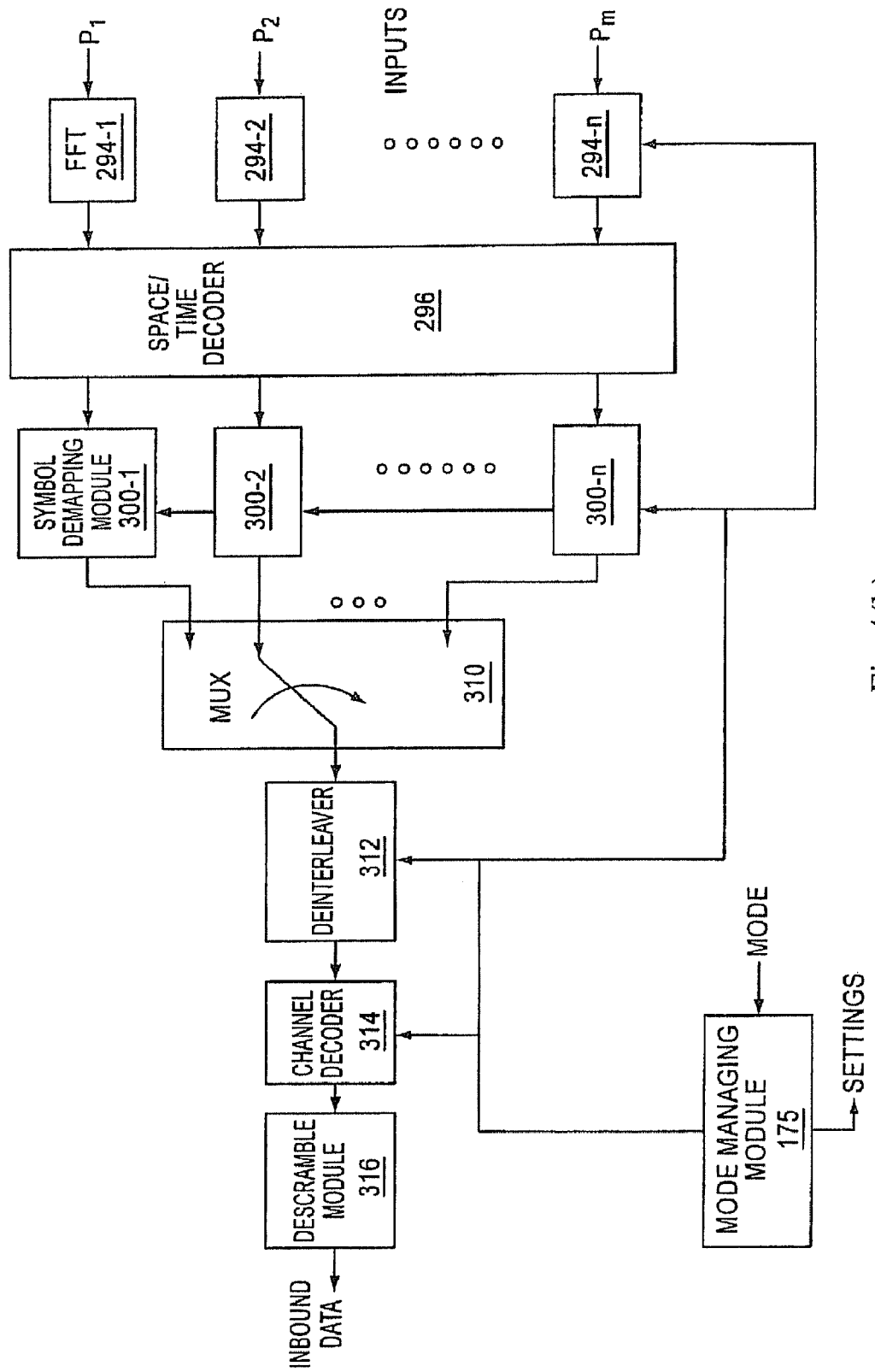

FIGS. 4(a) and 4(b) illustrate a schematic block diagram of another embodiment of a receiver in accordance with the present invention. FIG. 4(a) illustrates the analog portion of the receiver which includes a plurality of receiver paths. Each receiver path includes an antenna 250-1 through 250-n, RF filters 255-1 through 255-n, low noise amplifiers 260-1 through 260-n, I/O demodulators 265-1 through 265-n, analog filters 270-1 through 270-n and 275-1 through 275-n, analog-to-digital converters 280-1 through 280-n and digital filters and down-sampling modules 290-1 through 290-n.

In operation, the antennas 250 receive inbound RF signals, which are band-pass filtered via the RF filters 255. The corresponding low noise amplifiers 260 amplify the filtered signals and provide them to the corresponding I/Q demodulators 265. The I/Q demodulators 265, based on a local oscillation, which is produced by local oscillator 100, down-converts the RF signals into baseband in-phase and quadrature analog signals.

The corresponding analog filters 270 and 275 filter the in-phase and quadrature analog components, respectively. The analog-to-digital converters 280 convert the in-phase and quadrature analog signals into a digital signal. The digital filtering and down-sampling modules 290 filter the digital signals and adjust the sampling rate to correspond to the rate of the baseband processing, which will be described in FIG. 4(b).

FIG. 4(b) illustrates the baseband processing of a receiver. The baseband processing portion includes a plurality of fast Fourier transform (FFT)/cyclic prefix removal modules 294-1 through 294-n, a space/time decoder 296, a plurality of symbol demapping modules 300-1 through 300-n, a multiplexer 310, a deinterleaver 312, a channel decoder 314, and a descramble module 316. The baseband processing module may further include a mode managing module 175. The receiver paths are processed via the FFT/cyclic prefix removal modules 294 which perform the inverse function of the IFFT/cyclic prefix addition modules 192 to produce frequency domain symbols as M-output paths. The space/time decoding module 296, which performs the inverse function of space/time encoder 190, receives the M-output paths.

The symbol demapping modules 300 convert the frequency domain symbols into data utilizing an inverse process of the symbol mappers 180. The multiplexer 310 combines the demapped symbol streams into a single path.

The deinterleaver 312 deinterleaves the single path utilizing an inverse function of the function performed by interleaver 176. The deinterleaved data is then provided to the channel decoder 314 which performs the inverse function of channel encoder 174. The descrambler 316 receives the decoded data and performs the inverse function of scrambler 172 to produce the inbound data 98.

As noted above, STBC is usually performed with pairs of antennas, utilizing Orthogonal Frequency Division Multiplexing (OFDM). With multiple antennas, i.e. with more than two antennas, multiple streams can be utilized to achieve higher data rates. In such cases, STBC is applied over some of the transmit antennas, but other antennas transmit signals without STBC. These other antennas may transmit using (SDM). Thus, portions of the signal streams have diversity gains, while others do not. It is also possible to have greater coding gains from better signal streams. Given these additional possibilities, a receiver according to the present invention should have the ability to dtect and separate signals to achieve these gains.

Figures 5, 8:
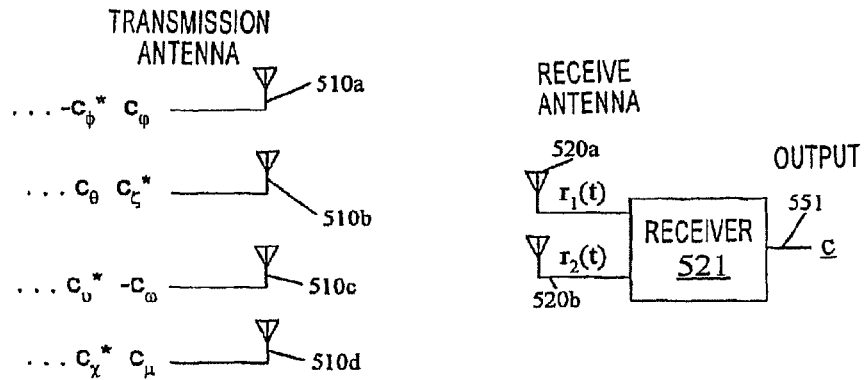
FIG. 5 is a diagram of an example asymmetric communication in accordance with one embodiment of the present invention.
FIG. 8 is a diagram of STBC code rates, in accordance with one embodiment of the present invention.

FIG. 5 is a basic diagram illustrating one embodiment of an asymmetric communication system between wireless communication devices (e.g., a personal computer (PC), an access point, etc.). In this example, there are four transmitting antennas, 510a, 510b, 510c and 510d, where the number of transmit antennas may be represented by M, and two receiving antennas, 520a and 520b, where may be represented by N, of a receiver 521. The output of the receiver 521, 551, outputs the reconstructed the originating signals. In this example, only one output is illustrated, but multiple outputs from the receiver may be used and are within the scope of the instant invention. In the embodiment illustrated in FIG. 5, M is greater than N.

Figure 6:
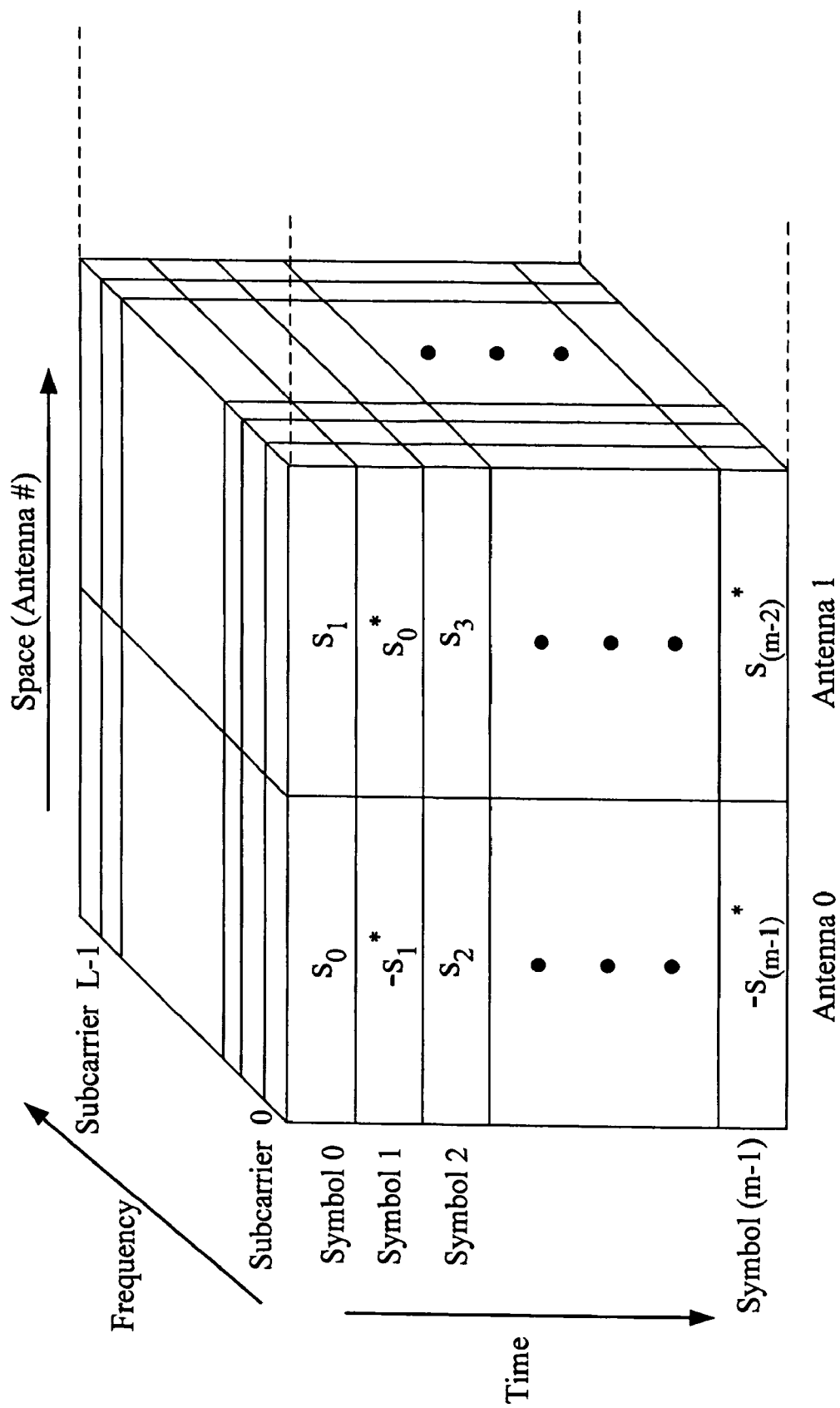
FIG. 6 a diagram of space-time block coding process, in accordance with one embodiment of the present invention.

FIG. 6 is a diagram of space-time block coding (STBC) that plots time versus frequency versus space (i.e., antennas). As shown, the frequency is dividing into a plurality of subcarriers (e.g., 64 for a 20 MHz channel, 128 for a 40 MHz channel). As is also shown, the space is divided into a number of antennas. In this illustration, only two antennas are shown, but more may be used, as indicated by the dotted lines. As is further shown, time is divided into a plurality of symbols. Thus, for each time interval, each subcarrier on each antenna supports a particular symbol. It is noted that "*" denotes complex conjugation, $s_j$ is a constellation point j on Orthogonal Frequency Division Multiplexing (OFDM) subcarrier k, and that the STBC (space time block coding) is independently applied to each of the L OFDM subcarriers.

In the case of two antenna asymmetrical wireless communication, such a communication may be implemented using simple spatial multiplexing where different information is transmitted on each of the two antennas. Alternatively, space time block coding may be used. In this instance, with a rate=1 Alamouti code, the symbol allocation is as shown, where $s_0$ is the first constellation point transmitted on subcarrier k and $s_1$ is the second constellation point transmitted on subcarrier k+1.

In the case of three antenna asymmetrical wireless communication, the coding is different. In this example, on each OFDM subcarrier index k, the encoded transmission is as shown. With this configuration, one rate=1 Alamouti space time block code (STBC) stream may be transmitted along with one uncoded stream per OFMD subcarrier k with a coding delay of two symbol periods. Alternatively, a rate=1 Alamouti STBC stream may be transmitted with one repetition-code stream per OFDM subcarrier index k, which yields a decoding delay of two symbol periods. Note that the same STBC is applied to the OFDM subcarriers. Alternatively, STBC may be applied to alternating pairs of antennas. The decoding delay is still two symbol periods. The STBC is across antennas {0, 1} in the first two symbol periods, then {0, 2} in the next two symbol periods, then {2, 3} in the next two. Note that, with the channel code (e.g. constraint length=6 convolutional code) across bits, this might improve the robustness of the lowest rates.

In the case of four antenna asymmetrical wireless communication, the transmission can include $s_0$, $s_1$, $s_2$ and $s_3$, followed by complex conjugate values. In this configuration, some sort of coding is implemented to ensure reliable transmission to, at a minimum, an N=2 station. Further, a transmit two rate=1 Alamouti space-time block coded streams per OFDM subcarrier index k may be constructed as shown. The decoding delay is two symbol periods. Alternatively, the STBC may be applied to alternating pairs of antennas, with the decoding delay still being at two symbol periods. For example, the STBC is across antennas {0, 1} and {2, 3} in the first two symbol periods, then {0, 2} and {1, 3}. Note that, with the channel code (e.g. constraint length=6 convolutional code) across bits, this might improve the robustness of the lowest rates.

There are numerous configurations of the transmitter based on data rates that affect the STBC encoding. For example, for Medium and High Rates, STBC encoding for 3 and 4 transmit paths (antennas) to 2 receive paths (antennas) may use a Code rate=2. Further, STBC encoding for 4 transmit paths (antennas) to 3 receive paths (antennas) may use a Code rate=3. In general, it is desirable to have the code rate equal the number of receive paths (antennas) for highest possible throughput.

As a further example for low rates, STBC encoding for 4 transmit paths (antennas) to 2, 3 or 4 receive paths (antennas) may use a Code rate=2. Alternatively, STBC encoding for 3 transmit paths (antennas) to 2, 3 or 4 receive paths (antennas) may use a Code rate=3/2. As an another alternative, STBC encoding for 2 transmit paths (antennas) to 2, 3 or 4 receive paths (antennas) may use a Code rate=1. In these examples, it is desirable to limit the diversity order to 2 as opposed to using a lower-rate channel code.

Figure 7:
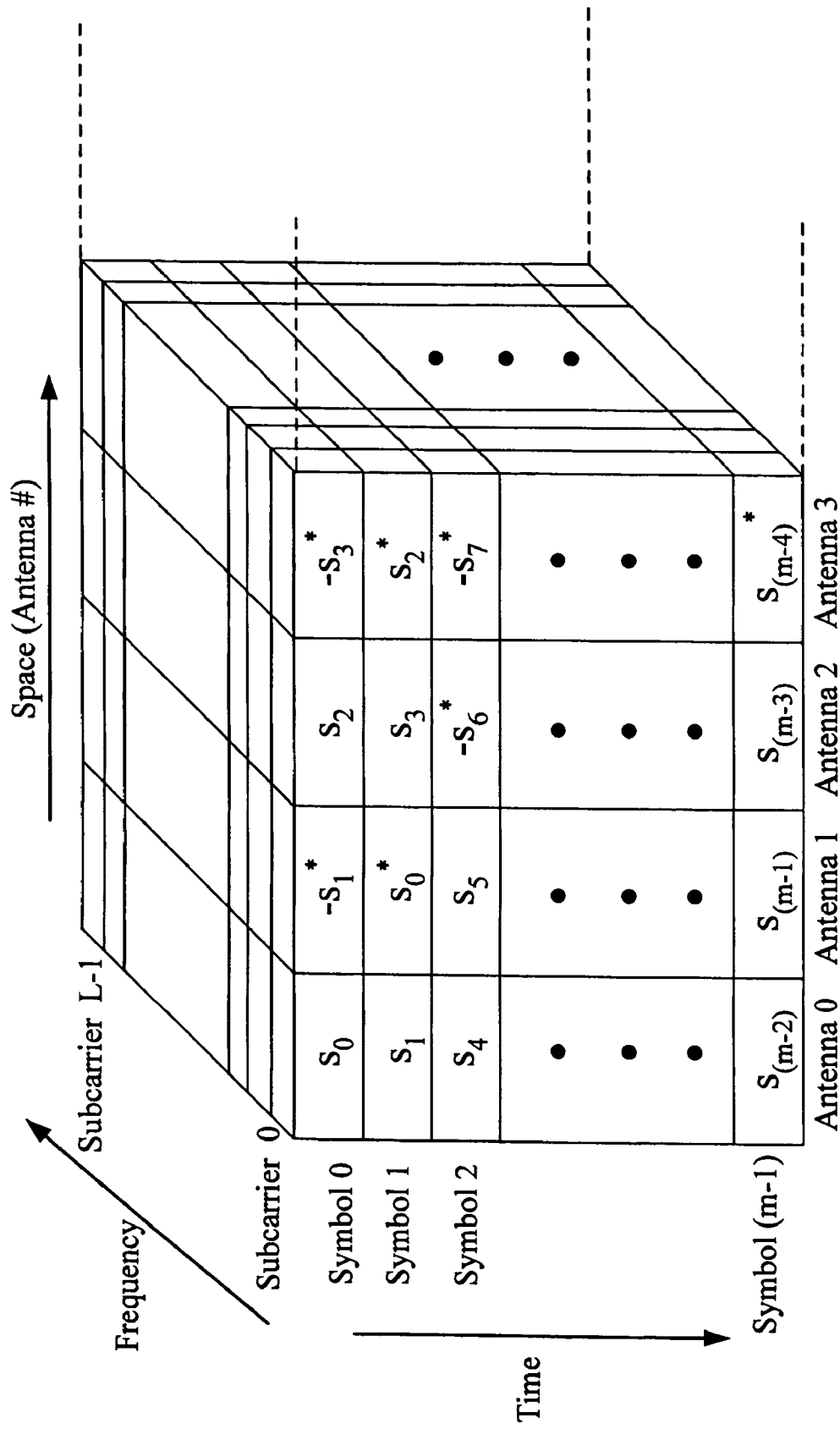
FIG. 7 a diagram of another space-time block coding process, in accordance with one embodiment of the present invention.

FIG. 7 is another diagram of STBC encoding for M transmit antennas and N receive antennas. In one embodiment, for two transmit antennas, for medium and high rates, spatial multiplexing is used; where different information is transmitted on each of the two transmit antennas for maximum rate. For low rates, a simple space time block code is used. For example, the STBC may be a modification of the rate=1 Alamouti code. In this figure, $s_0$ is the first constellation point transmitted on subcarrier K and $s_1$ is the second, etc. The same STBC is applied to each OFDM subcarrier.

In the case of three transmit antennas and a STBC code rate of 2/3 in this alternate embodiment, each OFDM subcarrier index k the transmissions are encoded as shown. With this encoding, one transmit rate may be equal to 1 2×1 space time block coded stream and the other transmit rate may be a repetition coded stream per OFDM subcarrier index k. In this instance, the decoding delay is two symbol periods and the same code may be applied to the OFDM subcarriers. As an alternative, the code rate may be 2, with the same symbol pattern. In this instance, each OFDM subcarrier index k provides the encoded transmissions as shown.

In the case of three transmit antennas and a code rate of ³⁄₂, the STBC is applied to alternating pairs of antennas and the decoding delay is two symbol periods. For instance, the STBC is across antennas {0, 1} in the first two symbol periods, then antennas {0, 2} in the next two symbol periods, and then antennas {2, 1} in the next two symbol periods, with the symbol mapping as shown.

In the case of STBC for three transmit antennas and a code rate of 2, the STBC is applied to alternating pairs of antennas and the decoding delay is two symbol periods. For instance, the STBC is across antennas {0, 1} in the first two symbol periods, then antennas {0, 2} in the next two symbol periods, and then antennas {2, 1} in the next two symbol periods, with the symbol mapping as shown.

In the case of STBC for four transmit antennas and a code rate of 2, this is also illustrated in FIG. 7. In this case, a transmit two rate=1 Alamouti space time block coded streams per OFDM subcarrier index k may be selected, which yields a decoding delay of two symbol periods. Note that the same code is applied to the OFDM subcarriers. Alternatively, for four transmit antennas and a code rate of 2, the STBC is applied to alternating pairs of antennas, with a decoding delay of two symbol periods. For example, the STBC is across antennas {0, 1} and {2, 3} in the first two symbol periods, then {0, 2} and {1, 3} in the next two symbol periods.

In the case of STBC for four transmit antennas and a code rate of 3, a transmit two rate=1 Alamouti space time block coded streams per OFDM subcarrier index k may be selected, which yields a decoding delay of two symbol periods. Note that the same code is applied to the OFDM subcarriers. Alternatively, the STBC is applied to alternating pairs of antennas, with the decoding delay being two symbol periods. For example, the STBC is across antennas {0, 1} in the first two symbol periods, then {0, 2}, {0,3}, {1, 2}, {1, 3}, and {2, 3} in the next two symbol periods.

FIG. 8 is a summary of the STBC code rates for varying data rate categories.

FIG. 9 is a flow diagram for a method of communicating data to M receiving antennas from N transmitting antennas, where M and N are integers and unequal, having the steps of sending a message to determine a number of transmit paths to be used (FIG. 9, 910), awaiting an acknowledgement message comprising a number of receiver paths (FIG. 9, 920), setting the number of transmit paths based on at least the acknowledgement message (FIG. 9, 930), producing data streams from outbound data based on the number of transmit paths (FIG. 9, 940), applying the data streams to a space/time encoder to produce encoded signals (FIG. 9, 950) and transmitting the encoded signals from at least a portion of N transmitting antennas (FIG. 9, 960).

The receiver needs to know the number of antennas used to estimate the full channel and exploit either spatial multiplexing or transmitter diversity gain using a space-time code. To enable a transmitter to step up its number of spatial streams for higher throughput, the receiver must indicate how many full receiver paths it has (e.g., FIG. 9, 920). For instance, a transmitter starts out transmitting no more than two streams, using a rate=1 or rate=2 space-time code, if it has more than 2 transmit paths (e.g., FIG. 9, 910). For examples: a rate=2 STBC for 3 or 4 transmit paths, or a rate=1 STBC for 2, 3, or 4 transmit paths.

In response, the receiver provides an ACK (or block ACK) that includes the number of full receiver paths usable by the acknowledging STA in its SIGNAL or SIGNAL_N field (e.g., FIG. 9, 920). It is noted that the transmitted frame includes number of full transmit paths in SIGNAL and/or SIGNAL_N field. The number of full receive paths is in SIGNAL and/or SIGNAL_N field or SERVICE field. The transmitted frame is encoded with k<=min(M, N) streams and rate=k STBC if k<N, where k=1, ³⁄₂, and min(M, N) are the preferred cases. The transmitted frame includes number of full transmit paths in SIGNAL and/or SIGNAL_N field. The number of full receive paths is in SIGNAL and/or SIGNAL_N field or SERVICE field. The transmitted frame is encoded with k<=min (M, N) streams and rate=k STBC if k<M, where k=1, {fraction (³⁄₂)}, and min(M, N) are the preferred cases.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A method of communicating data to a receiver having M receiving antennas from a transmitter having N transmitting antennas, where M and N are integers, the method comprising:
    sending a message to determine a number of transmit paths to be used, wherein the message is sent using a first one of a plurality of space/time code rates based at least on a number of available transmit paths in the transmitter;
    awaiting an acknowledgement message comprising a number of receiver paths;
    setting the number of transmit paths and a second one of a plurality of space/time code rates based on at least the acknowledgement message;
    producing data streams from outbound data based on the number of transmit paths;
    applying the data streams to a space/time encoder to produce encoded signals; and
    transmitting the encoded signals from at least a portion of N transmitting antennas, wherein
    M and N are unequal.

2. The method of claim 1, wherein the number of transmit paths is less than the portion of the N transmitting antennas.

3. The method of claim 1, wherein the applying of the data streams to the space/time encoder comprises encoding the data streams through space-time block coding.

4. The method of claim 1, wherein the applying of the data streams to the space/time encoder comprises encoding the data streams through a turbocoding scheme.

5. The method of claim 1, wherein the message is compatible with legacy systems employing a single antenna.

6. The method of claim 5, wherein the legacy systems comprise systems communicating according to IEEE 802.11 wireless standards.

7. The method of claim 1, wherein the first one of the plurality of space/time code rates of the message is 2 if the transmitter has more than 2 transmit paths available.

8. An apparatus for communicating data from N transmitting antennas to M receiving antennas, where M and N are integers, comprising:
    a transceiver operable to:
        send a message to determine a number of transmit paths to be used, wherein the message is sent using a first one of a plurality of space/time code rates based at least on a number of available transmit paths in the transceiver;
        await an acknowledgement message comprising a number of receiver paths;

set the number of transmit paths and a second one of a plurality of space/time code rates based on at least the acknowledgement message;

produce data streams from outbound data based on the number of transmit paths;

space/time encode the data streams to produce encoded signals; and transmit the encoded signals from at least a portion of the N transmitting antennas, wherein M and N are unequal.

9. The apparatus of claim 8, wherein the number of transmit paths is less than the portion of the N transmitting antennas.

10. The apparatus of claim 8, wherein the transceiver is configured to space/time encode the data streams through space-time block coding.

11. The apparatus of claim 8, wherein the transceiver is configured to space/time encode the data streams through a turbocoding scheme.

12. The apparatus of claim 8, wherein the message is compatible with legacy systems employing a single antenna.

13. The apparatus of claim 12, wherein the legacy systems comprise systems communicating according to IEEE 802.11 wireless standards.

14. The apparatus of claim 8, wherein the first one of the plurality of space/time code rates of the message is 2 if the transceiver has more than 2 transmit paths available.

15. An apparatus for communicating data from a transmitter having N transmitting antennas to a receiver having M receiving antennas, where M and N are integers that are unequal, comprising:

a demultiplexer configured to set a number of transmit paths and to produce data streams from outbound data; and a space/time encoder configured to produce encoded signals from the data streams; and the N transmitting antennas, wherein at least one of the N transmitting antennas is configured to send a message to determine the number of transmit paths to be used and to receive an acknowledgement message comprising a number of receiver paths, wherein the message is sent using a first one of a plurality of space/time code rates based on at least a number of available transmit paths in the transmitter, the demultiplexer is configured to set the number of transmit paths based on at least the acknowledgement message, the space/time encoder is configured to produce the encoded signals based at least in part on a second one of a plurality of space/time code rates that is set based on at least the acknowledgement message, and the encoded signals are transmitted from at least a portion of the N transmitting antennas.

16. The apparatus of claim 15, wherein the number of transmit paths is less than the portion of the N transmitting antennas.

17. The apparatus of claim 15, wherein the space/time encoder is configured to encode the data streams through space-time block coding.

18. The apparatus of claim 15, wherein the space/time encoder is configured to encode the data streams through a turbocoding scheme.

19. The apparatus of claim 15, wherein the message is compatible with legacy systems employing a single antenna.

20. The apparatus of claim 15, wherein the legacy systems comprise systems communicating according to IEEE 802.11 wireless standards.

21. The apparatus of claim 15, wherein the first one of the plurality of space/time code rates of the message is 2 if the transmitter has more than 2 transmit paths available.

* * * * *